(12) United States Patent
Korolev et al.

(10) Patent No.: US 7,743,030 B1
(45) Date of Patent: Jun. 22, 2010

(54) METHODS AND APPARATUS FOR DECLARATIVE LOG COLLECTION

(75) Inventors: Eugenio Korolev, Framingham, MA (US); Charuta Vijaykumar Apte, Milford, MA (US); Boris Farizon, Westborough, MA (US); Anoop George Ninan, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 726 days.

(21) Appl. No.: 11/540,184

(22) Filed: Sep. 29, 2006

(51) Int. Cl.
*G06F 17/30* (2006.01)
(52) U.S. Cl. .................................... 707/648; 707/672
(58) Field of Classification Search ................. 707/102, 707/103, 204, 205
See application file for complete search history.

(56) References Cited

U.S. PATENT DOCUMENTS

| | | | | |
|---|---|---|---|---|
| 5,949,976 A * | 9/1999 | Chappelle | ................... | 709/224 |
| 6,282,175 B1 * | 8/2001 | Steele et al. | ................ | 370/254 |
| 6,760,763 B2 * | 7/2004 | Jennings et al. | ............. | 709/224 |
| 6,985,901 B1 * | 1/2006 | Sachse et al. | ................. | 707/10 |
| 2001/0044817 A1 * | 11/2001 | Asano et al. | ................ | 709/100 |
| 2004/0236866 A1 * | 11/2004 | Dugatkin et al. | ............ | 709/235 |
| 2005/0160118 A1 * | 7/2005 | Berkowitz et al. | .......... | 707/204 |
| 2006/0037016 A1 * | 2/2006 | Saha et al. | ................... | 717/178 |
| 2006/0136360 A1 * | 6/2006 | Gebhart et al. | ................. | 707/1 |
| 2007/0028116 A1 * | 2/2007 | Murison et al. | ............. | 713/181 |
| 2007/0156698 A1 * | 7/2007 | Gebhart et al. | ................ | 707/10 |

* cited by examiner

*Primary Examiner*—James Trujillo
*Assistant Examiner*—Fatima P Mina
(74) *Attorney, Agent, or Firm*—Chapin IP Law, LLC

(57) ABSTRACT

A log collection utility (LCU) operable in a storage area network (SAN) to identify the various types of log files generated in the SAN, compute the location of each of the log files, and collect the log files for consolidation and analysis in a common repository. A designator file enumerates log files for collection. The LCU generates a discovery script for each host, and the hosts generate an identity of each of the log files via execution of the discovery script. The LCU generates a collection script operable to gather the each of the log files. The LCU thus gathers a plurality of log files generated by dissimilar applications and nodes in the SAN via a declarative mechanism that specifies the types of log files via a log file designator, and generates executable scripts that collects the log files in a manner that is agnostic to operating systems, platforms, and directory structures.

16 Claims, 7 Drawing Sheets

METHODS AND APPARATUS FOR DECLARATIVE LOG COLLECTION

BACKGROUND

In a networked environment such as a storage area network (SAN), a SAN management application monitors and manages manageable entities in the SAN. Each of the manageable entities is a component, or resource, deployed with other SAN components in a particular configuration. The manageable entities include storage arrays, connectivity devices, and hosts. Typically, software entities known as agents execute on the hosts for gathering, reporting, and monitoring the manageable entities in the SAN. The manageable entities are responsive to the agents for reporting various status metrics back to the agents and receiving control information from the agents. A management server executes the SAN management application, and oversees the agents. The management server is responsive to a console having a graphical user interface (GUI) for receiving and displaying operator parameters with a SAN operator.

In general, therefore, the storage area network (SAN) is a collection of data storage systems that are networked via a switching fabric to a number of host computer systems operating as data servers for user access. In a large storage area network, the interconnections between the manageable entities may become numerous and complex. A discovery operation identifies the topology of the SAN so that the management application may identify, manipulate, and report on each of the manageable entities and interconnections in the SAN. Each of the hosts includes agents for monitoring and manipulating the manageable entities corresponding to that host. The hosts, therefore, may include various applications and agents depending on the manageable entities responsive to the host. Each of the applications and agents may generate log files to track the operational history of the host. The location of the log file is generally specific to the particular application and agent. Each host may therefore generate multiple logs in various locations on the host. In a large SAN, there may be a multitude of log files scattered in various places on the SAN.

SUMMARY

A networked environment includes many interconnected nodes for providing a variety of information and data based services to users. In a particular type of networked environment, a storage area network (SAN) provides mass data storage and retrieval services. In such a storage area network, the nodes include storage arrays, switching devices, and hosts, and are interconnected in a SAN fabric of interconnections. The SAN management application maintains the topology of the SAN to identify each of the components, or nodes, and the relations between them. The SAN nodes are individual manageable entities responsive to the management application, and include network devices such as the storage arrays, switching devices, and hosts, as well as hardware and software components such as disks, ports, agents, adaptors, and other included manageable entities.

The management application therefore integrates monitoring and control of a variety of manageable entities within the SAN. Many of the manageable entities generate one or more log files, either directly or via another manageable entity (such as disk drives in a storage array). Conventional management applications, however, suffer from the shortcoming that the log files are from dissimilar applications and sources and are difficult to identify and aggregate in a common, consistent manner. It is cumbersome to identify and enumerate (list) available log files in a common list or repository. Conventional arrangements, therefore, cannot provide a declarative mechanism for on-demand aggregation and collection of dissimilar log files from different hosts with possibly different operating systems and file structures. Accordingly, many conventionally arranged log files require cumbersome, unwieldy procedures to collect and many log files may simply evade collection and/or analysis.

In a storage area network (SAN), therefore, it is beneficial to have a regular, repeatable mechanism to collect and analyze the various log files generated by or on behalf of the various manageable entities in the SAN. Accordingly, configurations herein substantially overcome the difficulties of conventional gathering of log files by defining a log collection utility (LCU) operable to identify the various types of log files generated in the SAN, compute the location of each of the log files, and collect the log files for consolidation and analysis in a common repository. The log collection utility employs a log designator file adapted to enumerate each of the types of log files for collection and the hosts they reside on. Further details of log file identification across multiple heterogeneous host systems are discussed in copending U.S. patent application Ser. No. 11/540,105, filed concurrently, entitled "METHODS AND APPARATUS FOR LOCATING NETWORK LOGS", incorporated herein by reference.

The management application collects and analyzes the log files in a declarative, on-demand manner by enumerating the location of each of the log files in a log file designator, and generating an identification script operable for identifying each of the log files sought. The LCU generates a discovery script for each of a plurality of target hosts, and the target host generates an identity of each of the log files via execution of the discovery script, such as a Perl script. The LCU aggregates the resulting identities in a task definition file that lists each of the log files identified for potential collection, and is employed by the management application for generating a collection script operable to gather the each of the log files and consolidate them in a common location, typically by copying and zipping (compressing) each of the identified log files. In this manner, the log collection utility is operable to collect the contents of each of a plurality of log files generated by dissimilar applications and nodes in the SAN via a declarative mechanism that specifies the types of log files via a log file designator, and generates executable scripts that collects each of the log files in a manner that is agnostic to operating systems, platforms, and directory structures around which the log files are written and stored.

In further detail, the method of retrieving log files disclosed herein include identifying a set of log files accessible via a SAN, and generating a discovery script having commands for identifying (discovering) each of the log files identified in the set of log files. The SAN management server (server) sends the discovery script to a SAN node having at least one of the identified log files, such that the SAN node is operable to execute the discovery script, and receives, from the SAN node, an identity of each of the logs identified via the executed discovery script. The server then generates, from the identity of the logs (i.e. task definition, discussed further below, or other suitable file specification), a collection script operable to retrieve the contents of each of the identified log files, in which the collection script is generated independently of the operating system of the SAN node allowing the log file collection mechanism to be employed in a consistent manner regardless of the platform of each of the target hosts (SAN nodes receiving the log file discovery and collection scripts).

The server sends the collection script to the SAN node, receives, from each SAN node, each of the logs collected by the collection script.

As indicated above, a typical SAN includes a plurality of SAN nodes, each of the SAN nodes having at least one agent, the agent being responsive to the discovery script, such that log file collection includes sending the discovery script to each of the plurality of SAN nodes, and receiving the identity of each of the logs from the SAN node (host). The log collection utility at the server generates a task definition indicative of the collective logs on each of the SAN nodes, and then generates the collection script form the task definition and XML designator.

Thus, each SAN node is defined by a host having a master agent, such that the master agent is operable to execute the collection script. The server generates, for each host, a collection script operable to collect the discovered logs corresponding to that host, executes the generated collection script on the host, and receives the collected log files at the server.

In the example arrangement, server/host load balancing may occur by determining, based on system load, whether to compress collected logs at the host or at the server, and selectively compressing the collected logs at the host or at the server based on the determination. If the server is less burdened, the mechanism transmits, by each host, collected logs to the server. The server identifies categories of log files, including, for example, infrastructure, agent or 3rd party applications, to name several, and aggregates the transmitted logs from each host at the server in a common repository, such that the logs are arranged by categories. Additional categories may be defined by each of the designators in an XML designator file. The server compresses the aggregated logs in the common repository.

If the hosts (target SAN nodes) are less burdened, then the hosts aggregate, on each of the hosts, the collected logs obtained from the collection script, arranges them by their respective category, and compresses the collected logs obtained from the collection script. The hosts transmit the compressed logs to the server, and aggregates, at the server, transmitted logs from each of the hosts.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the storage area network (SAN), it is beneficial to collect and analyze the various log files generated by or on behalf of the various manageable entities in the SAN. A log collection utility (LCU) is a component of the management application that identifies the various types of log files generated in the SAN, computes the location of each of the log files, and collects the log files for consolidation and analysis in a common repository. The log collection utility periodically collects and/or processes the log files by enumerating the location of each of the log files as a log file designator, and generating a discovery script operable for identifying each of the log files sought. The log file designators typically take the form of an XML file or other suitable syntax that provides a declarative mechanism for specifying the log files. Execution of the discovery script yields a task definition file that lists each of the log files identified, which is employed by the log collection utility for generating a collection script operable to gather the each of the log files and consolidate them in a common location. In this manner, the log collection utility is operable to find each of a plurality of log files generated by dissimilar applications and nodes in the SAN via a log type definition that enumerates each of the log files in a manner that is agnostic to operating systems, platforms, and directory structures around which the log files are written and stored.

Figure 1:
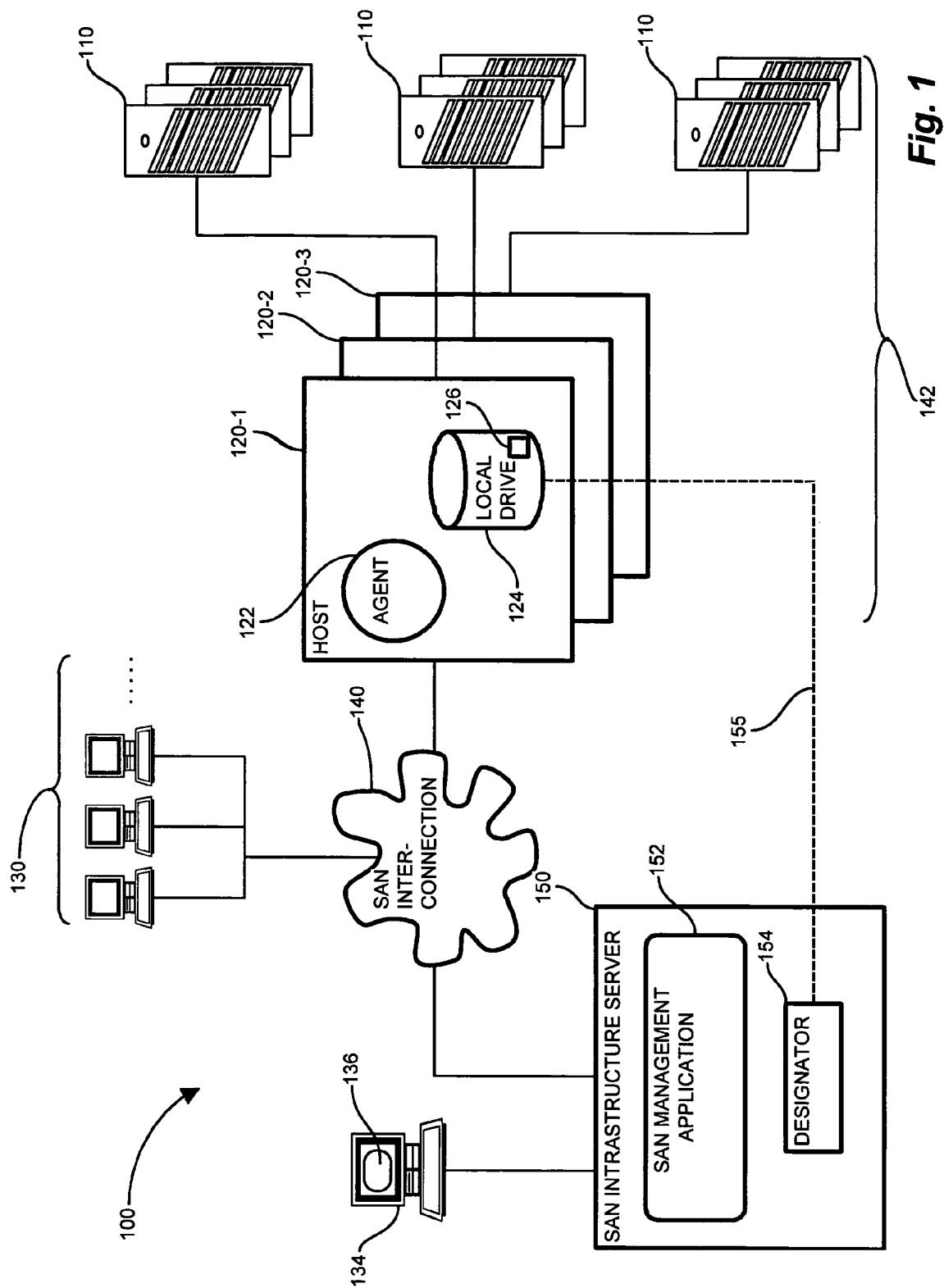
FIG. 1 is a context diagram of an exemplary managed information environment suitable for use with the present invention.

FIG. 1 is a context diagram of an exemplary managed information environment suitable for use with the present invention. Referring to FIG. 1, in a storage area network 100, storage arrays 110 are coupled to hosts 120 for providing data storage and retrieval services to a user community 130. A SAN interconnection 140 provides the network infrastructure to physically interconnect various SAN nodes 142, including storage arrays 110 and hosts 120-1 ... 120-N (120 generally). The SAN typically includes a plurality of heterogeneous nodes 142 characterized by a plurality of vendors, operating systems and platforms. Other network nodes, such as switching devices (not specifically shown) are also typically included. A SAN infrastructure server 150 includes a SAN management application 152 for monitoring and managing the SAN nodes 142, typically via a console 134 having a graphical user interface (GUI) 136. The hosts 120 include agents 122 responsive to the management application 152.

Each host 120 typically includes a plurality of agents 122 for performing a variety of management operations concerning the storage arrays 110, such as gathering performance statistics, performing access control, and configuration management tasks, for example. Each of the hosts 120 generates various logs (log files) 126 depending on the operations performed by the hosts 120. The log files 126 may be written to various repositories (i.e. directories) on a local volume 124 (i.e. local drive), depending on the operating system, devices connected to the host, and tasks requested of the host 120. In a large SAN 100, having many hosts 122 tasked with various specialized operations, multiple log files 126 may be stored in various locations on a particular host 122. In accordance with configurations herein, the management application 152 employs a log file designator 154 for identifying each of the logs on the local drive 124 on the hosts 120, shown by dotted line 155. The SAN management server 152 includes a log collection utility for identifying each of the log files 126 via a script, enumerating the log files as a task, and generating a collection script to retrieve each of the log files from the various hosts, discussed further below in FIG. 3.

Figure 2:
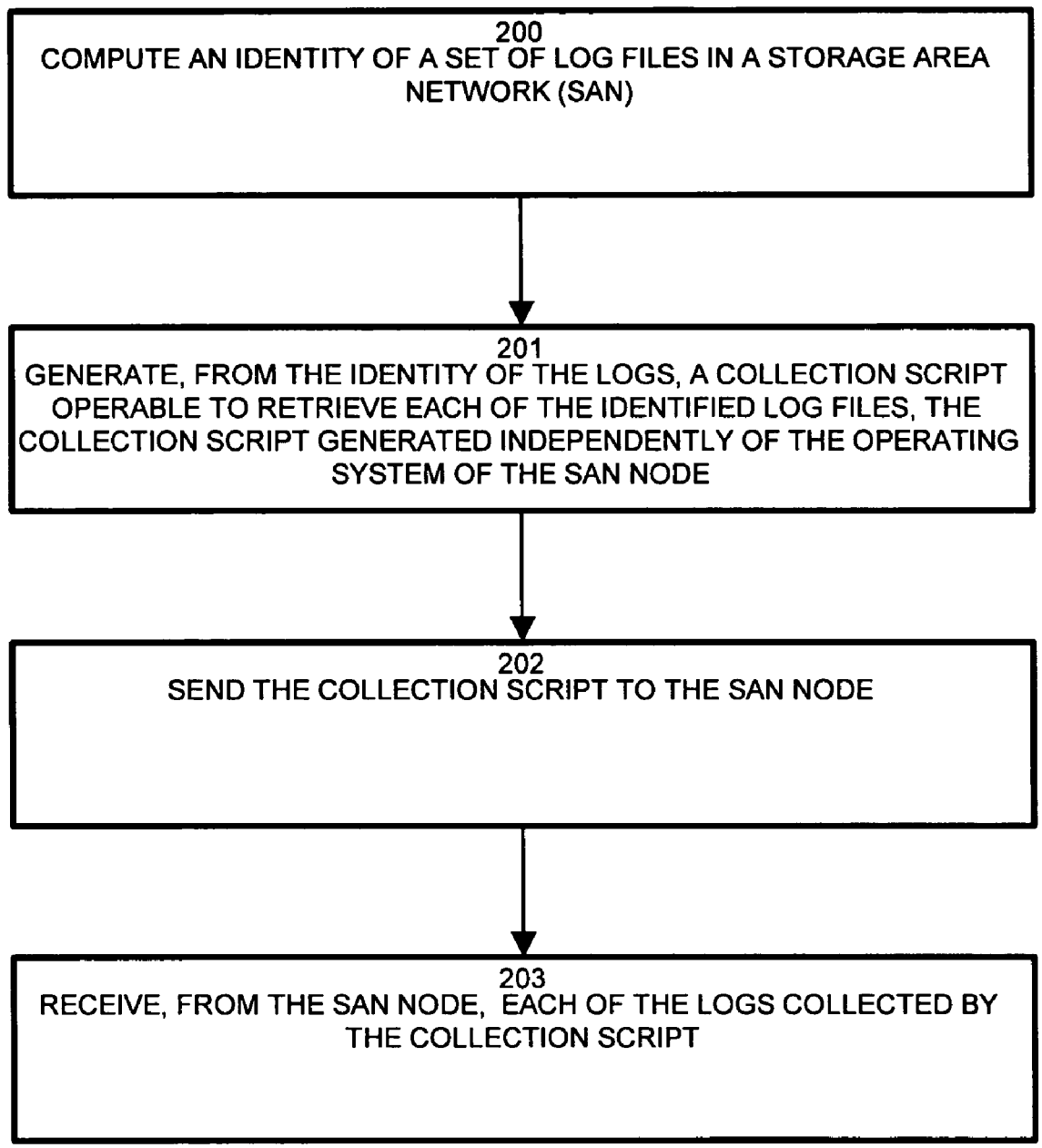
FIG. 2 is a flowchart of log file identification in the environment of FIG. 1.

FIG. 2 is a flowchart of log file collection via script generation as defined herein. Referring to FIGS. 1 and 2, the log collection utility (LCU) is operable to retrieve (collect) multiple log files 126 from heterogeneous hosts 120 in a storage area network (SAN) by computing an identity of a set of log files 126 in a storage area network (SAN), as depicted at step 200, and generating, from the identity of the logs (i.e. task definition) and logtype designator XML file 156, a collection script 192 operable to retrieve each of the identified log files 126, such that the collection scripts 192 are generated independently of the operating system of the SAN node (host) 120 they target, as shown at step 201. The log collection utility sends the generated collection scripts to each of the corresponding SAN nodes, as disclosed at step 202. The LCU then receives, from each of the SAN nodes 120, each of the logs 126 collected by the collection script via execution of the script at the respective SAN node 120, as depicted at step 203.

Figure 3:
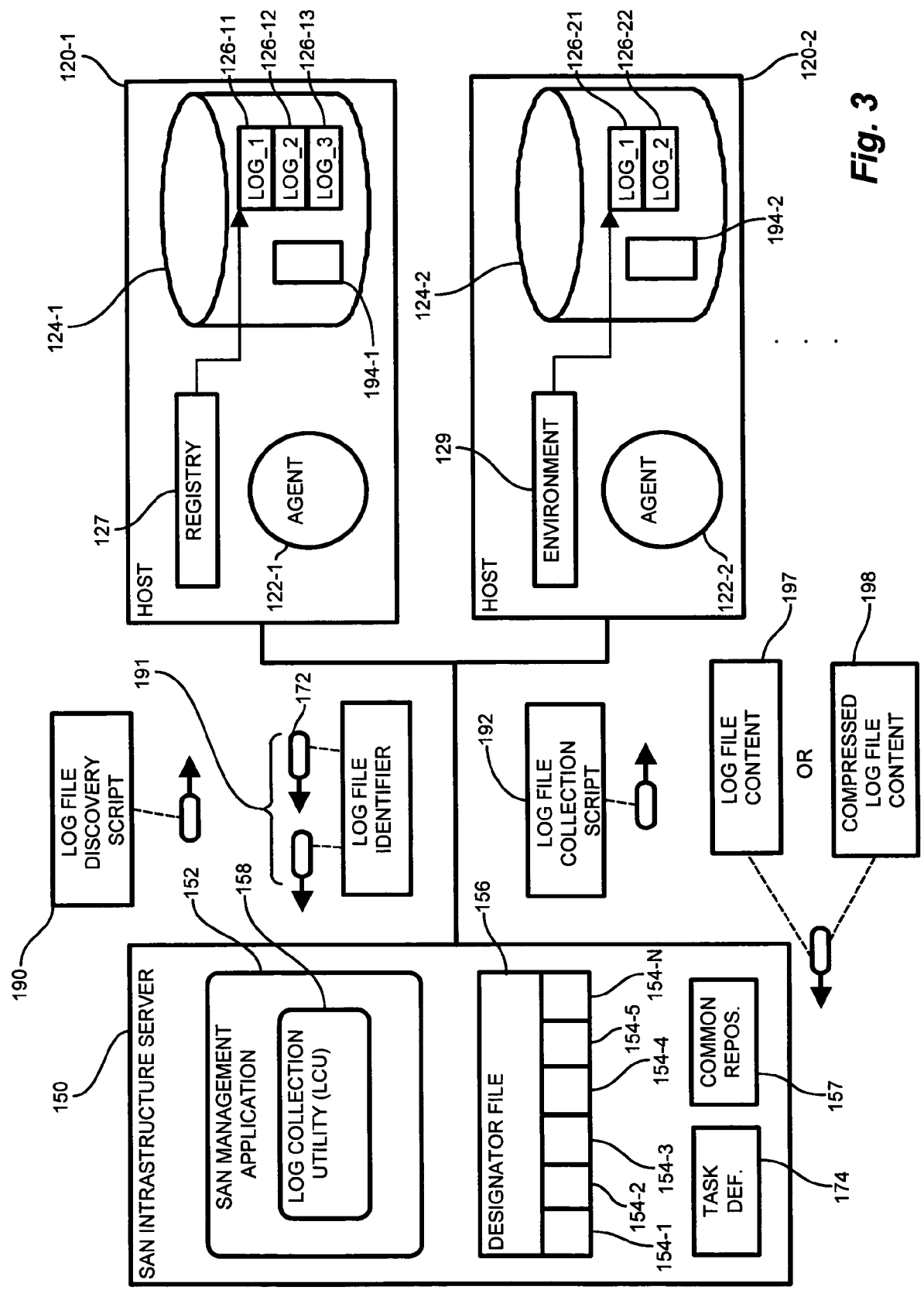
FIG. 3 is a block diagram of log file collection via script generation in the environment of FIG. 1.
Figure 4:
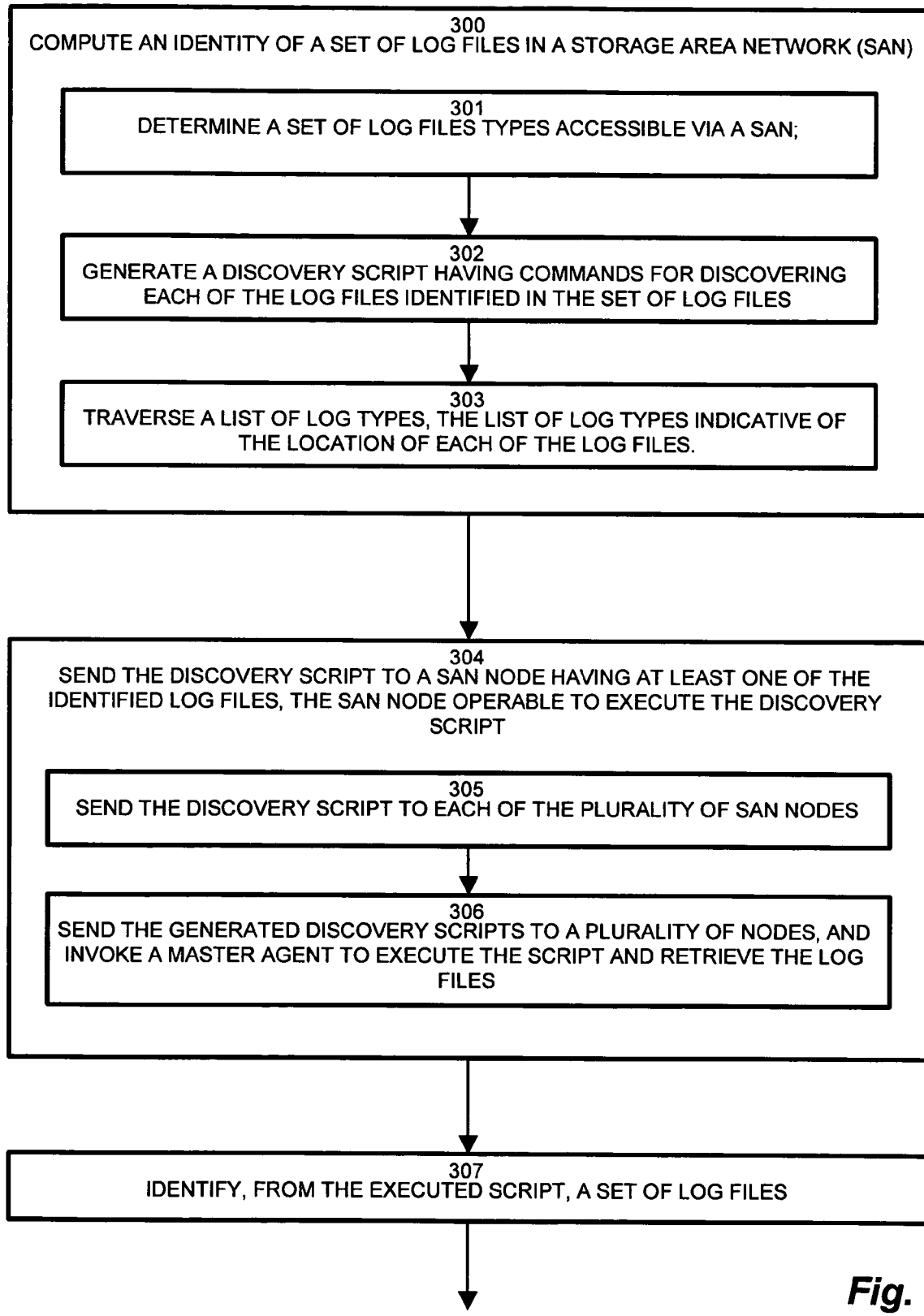
FIGS. 4-7 are a flowchart of script and task generation for collecting log files according to the system of FIG. 3.
Figure 5:
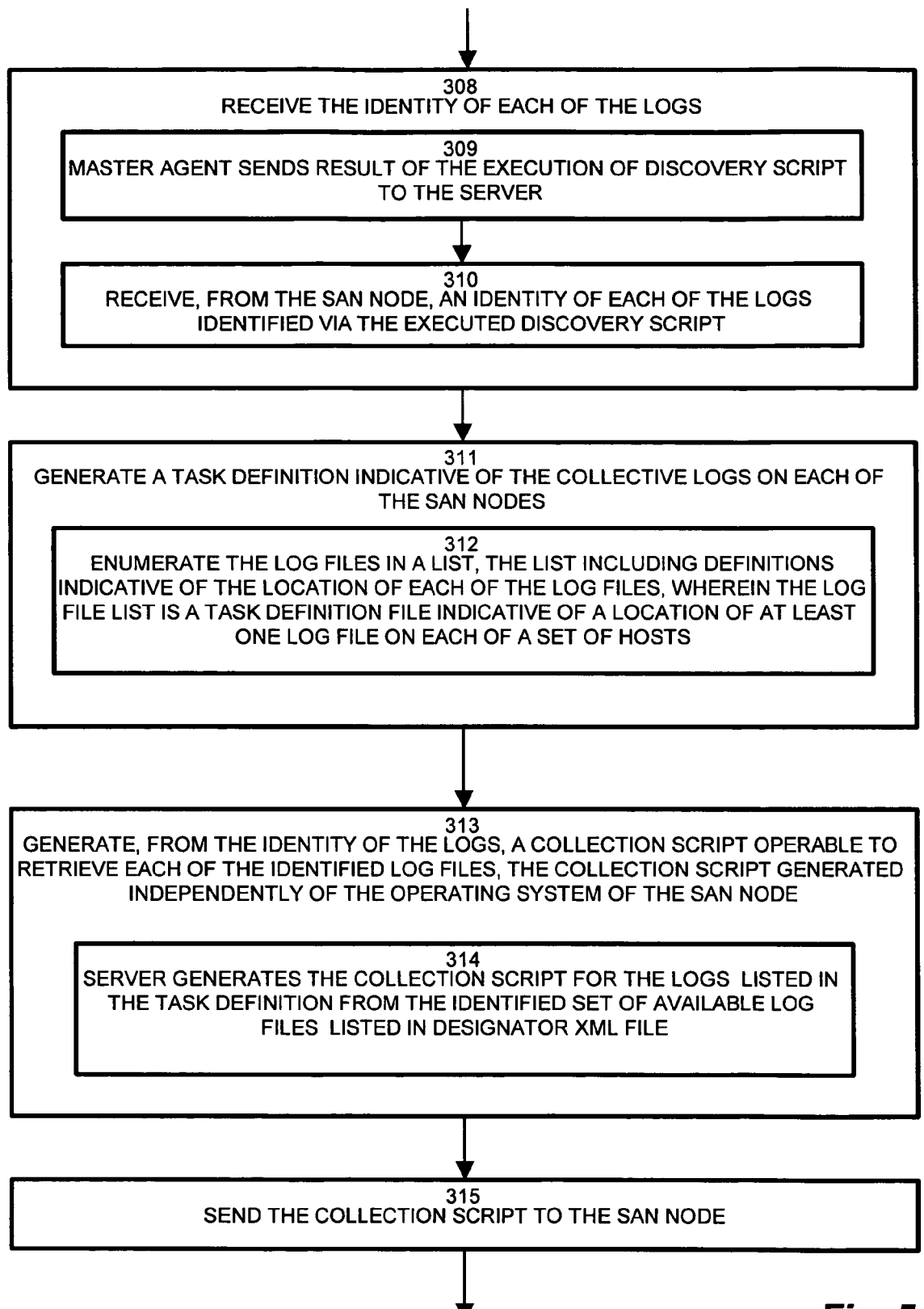
Figure 6:
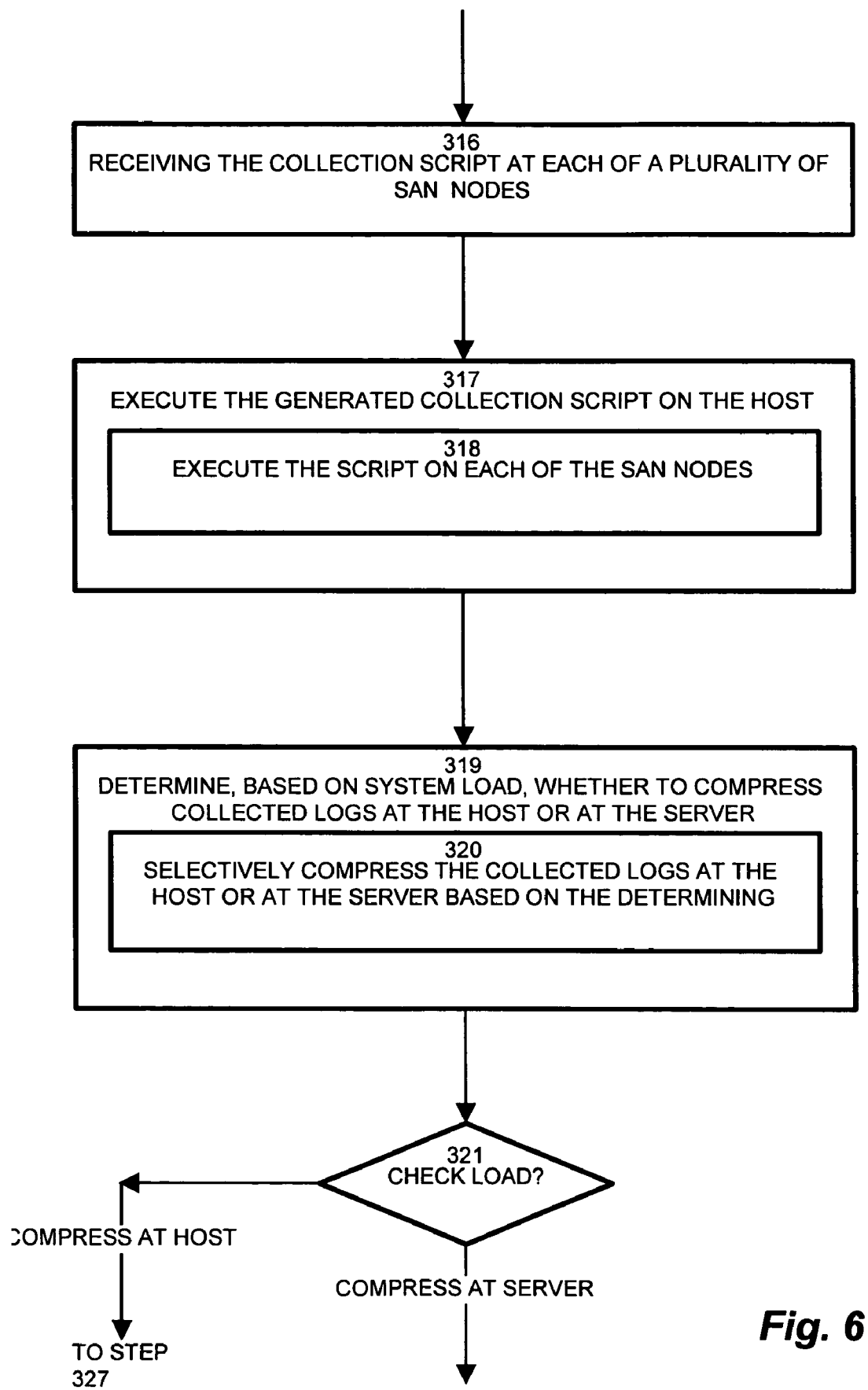
Figure 7:
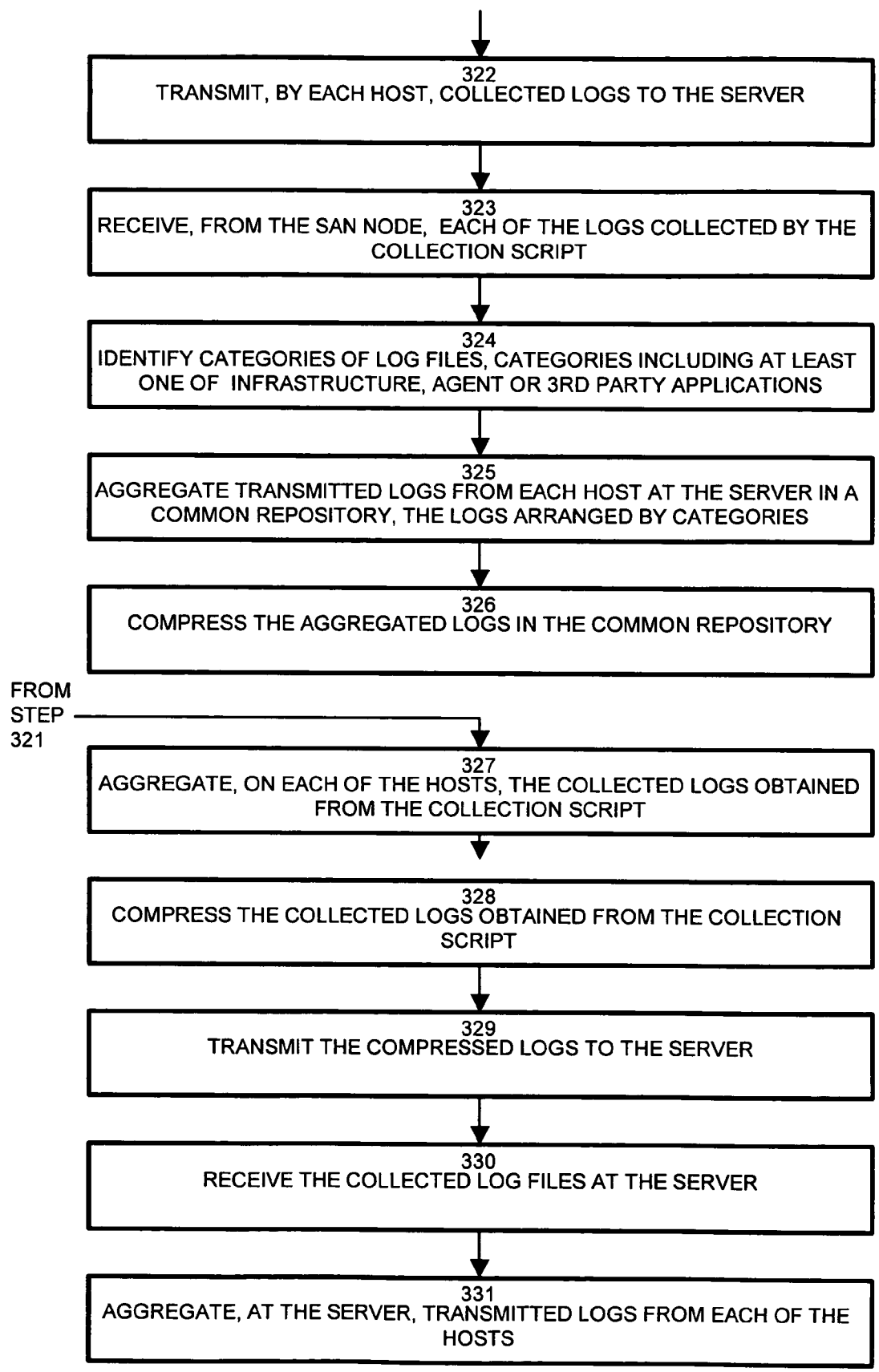

FIG. 3 is a block diagram of log file collection via script generation in the environment of FIG. 1. Referring to FIG. 3, the SAN infrastructure server 150 includes the SAN management application 152 having a log collection utility (LCU) 158. A designator file 156 includes a plurality of log file designators 154-1 . . . 154-N (154 generally) for each of the types of log files sought for collection. Each designator 154 identifies a set of one or more log files 126 on a particular host 120, as discussed in the copending application cited above. Using the designator file 156, the log collection utility 158 generates a log file discovery script 190 for each host 120 having log files 126-11 . . . 126-22 (126 generally). The LCU 158 sends the discovery script 190 to each host 120-N having log files for collection, and the host 120 executes the script 190 to generate the identity 172 of each log file 126. Each host 120 sends the one or more log file identifiers 172 identifying the log files 126 on that host 120. The LCU 158 then generates a collection script 192 for each host 120 based on the returned log file identifiers 172. In the example configuration, the discovery script 190 and the collection script 192 are Perl scripts, as is known to those of skill in the art, however other interpreted or executable scripts may be employed. The LCU 158 sends the log file collection scripts 192 to each respective host 120. The receiving host 120 executes the collection script 192 to collect each of the logs 126-N in a collection directory 194-1 . . . 194-2 (194 generally) or other repository for transmission to the LCU 158. Depending on the load of the hosts 120 and the infrastructure sever 150, the hosts 120 either transmit the content 197 of log files 126 in the collection directory 194 for compression at the server 150, or compress the files 126 at the host 120 for transmission in a compressed form 198, discussed further below.

FIGS. 4-7 are a flowchart of script and task generation for collecting log files 126 according to the system of FIG. 3. Referring to FIGS. 3-7, the server 150 first computes the identity 172 of a set of log files in a storage area network (SAN), as depicted at step 300. This includes, at step 301, determining a set of log files types accessible via a SAN. The log file types may be specified by a log file designator 154, as outlined in the copending patent application cited above, or by other suitable means. From the log file types, which may encompass a plurality of SAN (host) nodes 120, the server 150 generates a discovery script 190 having commands for discovering each of the log files identified in the set of log files 126, as depicted at step 302. Accordingly, the server 150 traverses the list of log types in the designator file 156, in which the list of log types are indicative of the location of each of the log files 126 on the remote hosts 120, as disclosed at step 303.

The server 150 sends the generated discovery script 190 to one or more SAN nodes 120 having at least one of the identified log files 126, such that the SAN node 120 is operable to execute the discovery script 190, as shown at step 304, in which each of the SAN nodes has at least one agent 122 responsive to the discovery script 190. A discovery script 190 may be sent to a plurality of SAN nodes 120-N, as depicted at step 305, in which each discovery script 190 computes log files accessible via the particular node. Each SAN node 120 further employs a master agent 122 responsive to the discovery script 190. The master agent 122 executes the received discovery script to retrieve at least one log file 126, as shown at step 306. Typically, each master agent 122 on each host 120 receives a discovery script 190 operable to identify a plurality of log files 126 on that host 120. Each of the receiving hosts 120 therefore identifies, from the executed script 190, a set of log files 126, as depicted at step 307.

Following execution of the discovery script 190, the server 150 receives the results 191 of the discovery script 190, as shown at step 308. The master agent 122 sends result of the execution of discovery script 190 to the server 150, as depicted at step 309, thus receiving, from each of the SAN nodes 120, an identity 172 of each of the logs 126 identified via the executed discovery script 190, as depicted at step 310. The identity of the log points to a specific location of a particular log file 126, while the designator 154 describes the manner of locating the file and may reference multiple log files 126 via wildcards and directory specifications. Using the returned identity 172, the server generates a task definition 174 indicative of the collective logs 126 on each of the SAN nodes 120, as disclosed at step 311. Therefore, for each host 120, the received results 191 identify the log files by enumerating the log files in a list, such that the list includes definitions indicative of the location of each of the log files, in which the log file list is a task definition 174 file indicative of a location of at least one log file 126 on each of a set of hosts 120-1 . . . 120-N, as depicted at step 312.

The server 150 generates, from the identity 172 of each of the logs 126, a collection script 192 operable to retrieve each of the identified log files 126, such that the collection script 192 is generated independently of the operating system of the SAN node 120 to which it is targeted, as shown at step 313. This includes generating the collection script 192 from the task definition 174. The server 150 therefore generate the collection script 192 for the logs 126 listed in the task definition 174 from the identified set of available log files listed in designator XML file 156, as depicted at step 314. The generated collection script 192 is operable to collect the discovered logs 126 corresponding to that host 120. Therefore, each SAN node further defines a host 120 having a master agent 122, such that the master agent 122 is operable to execute the collection script 192.

The server 150 sends the collection script 192 to one or more SAN nodes 120, as depicted at step 315. Each of the SAN nodes 120 receives the corresponding collection scripts 192, as shown at step 316, and executes the script 192, shown at step 317. The log collection utility 158 generates a collection script 192 for each SAN node 120 for which log files 126 were discovered. Accordingly, each master agent 122 on a SAN node 120 executes the respective collection script 192, depicted at step 318.

Depending on system load, the log files 126 are compressed at either the host 120 or server 150. Accordingly, the host 120 determines, based on system load, whether to compress collected logs 126 at the host 120 or at the server 150, as shown at step 319, and selectively compresses the collected logs 126-N at either the host 120 or at the server 150 based on the determining, as disclosed at step 320. A check is performed at step 321 to determine the result of the load determination. In this manner, load balancing occurs such that the organization and compression (i.e. zipping) of the log files is deferred to either the host 120 or server 150 as appropriate to distribute the processing load. If the server 150 is to perform the compression, then each master agent 122 on each host 120 transmits the collected logs 197 to the server 150, as shown at step 322, and the server 150 receives, from the SAN nodes 120, each of the logs 126 collected by the collection scripts 192, as shown at step 323. The server 120 identifies categories of log files 126, from among the categories that are defined in the logtype designator XML file 156 (e.g. infrastructure, agent and 3rd party applications), as depicted at step 324. The sever 150 aggregates the transmitted logs 126 from each host 15 in a common repository 157, in which the logs 126 are arranged by categories, as shown at step 325. The server 150 therefore arranges each of the log files 126 from the collective hosts 120-N by category. The server 150 compresses the aggregated logs 126 in the common repository 157, as shown at step 326, where they may be accessed by other applications in the management application 152 for various reporting, accounting and administrative operations.

If, based on the check at step 321, the compressing is to occur at the hosts 120, then each of the hosts 126 aggregates the collected logs 126 obtained from the collection script 192, based on the log category 180, as depicted at step 327. The hosts 120 compress the collected logs 126 obtained from the collection script 192, as shown at step 328, and each master agent 122 on each host 120 transmits the compressed logs 126 to the server 150, as depicted at step 329. The server 150 receives the collected, compressed log files 126, as disclosed at step 330, and aggregates, at the server 150 transmitted logs 126 from each of the hosts 120 for further reporting and administrative operations via the SAN management application 152, as shown at step 331.

Those skilled in the art should readily appreciate that the programs and methods for declarative log collection as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for declarative log collection has been particularly shown and described with references to embodiments thereof, it will be understood by those skilled in the art that various changes in form and details may be made therein without departing from the scope of the invention encompassed by the appended claims.

What is claimed is:

1. A method of retrieving log files comprising:
   computing an identity of a set of log files in a network environment including a plurality of nodes, the network environment including a storage area network (SAN) having SAN nodes:
   generating, from the identity of the log files, a collection script operable to retrieve each of the identified log files, the collection script generated independently of an operating system of a SAN node;
   sending the collection script to the SAN node;
   receiving, from the SAN node, each of the log files collected by the collection script;
   determining, based on system load, whether to compress collected log files at a host or at a server;
   selectively compressing the collected log files at the host or at the server based on the determining;
   aggregating, on each host, the collected log files obtained from the collection script;
   transmitting, by each host, the collected log files to the server;
   identifying categories of log files, categories including at least one of infrastructure, agent or 3rd party applications; and
   aggregating transmitted log files from each host at the server in a common repository, the log files arranged by categories.

2. The method of claim 1 wherein computing the identity of the set of log files further comprises:
   determining a set of log files types accessible via the network environment
   generating a discovery script having commands for discovering each of the log files identified in the set of log files;
   sending the discovery script to a SAN node having at least one of the identified log files, the SAN node operable to execute the discovery script; and
   receiving, from the SAN node, an identity of each of the log files identified via the executed discovery script.

3. The method of claim 2 further comprising a plurality of SAN nodes, each of the SAN nodes having at least one agent, the agent responsive to the discovery script, and:

sending the discovery script to each of the plurality of SAN nodes;
receiving the identity of each of the log files;
generating a task definition indicative of the collective log files on each of the SAN nodes; and
generating the collection script from the task definition.

4. The method of claim 3 wherein each SAN node further comprises a host having a master agent, the master agent operable to execute the collection script, further comprising:
generating, for each host, a collection script operable to collect the discovered log files corresponding to that host;
executing the generated collection script on the host; and
receiving the collected log files at the server.

5. The method of claim 2 further comprising:
receiving the collection script at each of a plurality of SAN nodes;
executing the script in each of the SAN nodes;
identifying, from the executed script, a set of log files;
zipping the identified log files into an aggregated log file; and
transmitting the aggregated log file back to the initiating host.

6. The method of claim 5 wherein the discovery script is executable on the SAN node, the SAN node operable to generate the identity of the log files from execution of the discovery script, the discovery script independent of the operating system and file system of the SAN node, further comprising:
generating the collection script from the identified set of available log files and the discovery script and the received identity of the log files.

7. The method of claim 6 wherein sending the discovery script further comprises a plurality of discovery scripts, each discovery script corresponding to a particular SAN node, further comprising:
sending the generated discovery scripts to a plurality of SAN nodes, each SAN node having a master agent responsive to the script and operable to retrieve at least one log file.

8. The method of claim 6 wherein generating the discovery script further comprises traversing a list of log types, the list of log types indicative of the location of each of the log files, wherein generating the discovery script includes using a log file designator that describes a manner of locating log files by referencing multiple log files via wildcards and directory specifications, wherein generating the discovery script occurs before generating the collection script.

9. The method of claim 6 wherein identifying the log files comprises enumerating the log files in a list, the list including definitions indicative of the location of each of the log files, wherein the log file list is a task definition file indicative of a location of at least one log file on each of a set of hosts.

10. A storage area network (SAN) infrastructure server for retrieving log files comprising:
a log collection utility operable to compute an identity of a set of log files on a SAN node in a storage area network (SAN);
a task definition operable to store each of a plurality of the computed identities, the log collection utility responsive to the task definition for generating, from the identity of the log files, a collection script operable to retrieve each of the identified log files, the collection script generated independently of an operating system of the SAN node;
an interface to a SAN infrastructure operable to send the collection script to the SAN node, the log collection utility further operable to receive, from the interface, each of the log files collected by the collection script;
the log collection utility further operable to:
determine, based on system load, whether to compress collected log files at a host or at a server;
selectively compress the collected log files at the host or at the server based on the determine;
aggregate, on each host, the collected log files obtained from the collection script;
transmit, by each host, the collected log files to the server;
identify categories of log files, categories including at least one of infrastructure, agent or 3rd party applications; and
aggregate transmitted log files from each host at the server in a common repository, the log files arranged by categories.

11. The server of claim 10 further comprising at least one log file designator, the log collection utility further operable to:
determine, using the log file designator, a set of log files types accessible via a SAN;
generate a discovery script having commands for discovering each of the log files identified in the set of log files;
send the discovery script to a SAN node having at least one of the identified log files, the SAN node operable to execute the discovery script; and
receive, from the SAN node, an identity of each of the log files identified via the executed discovery script;
further comprising a plurality of SAN nodes, each of the SAN nodes having at least one agent and a corresponding discovery script, the agent responsive to the discovery script, wherein the log collection utility is further operable to:
send the discovery script to each of the plurality of SAN nodes;
receive the identity of each of the log files;
generate a task definition indicative of the collective log files on each of the SAN nodes; and
generate the collection script form the task definition;
wherein each SAN node further comprises a host having a master agent, the master agent operable to execute the collection script, further comprising:
generate, for each host, a collection script operable to collect the discovered log files corresponding to that host;
execute the generated collection script on the host; and
receive the collected log files at the server.

12. The server of claim 11 wherein the host is further operable to:
receive the collection script at each of a plurality of SAN nodes;
execute the script on each of the SAN nodes;
identify, from the executed script, a set of log files;
compress the identified log files into an aggregated log file; and
transmit the aggregated log file back to the initiating host;
wherein the discovery script is executable on the SAN node, the SAN node operable to generate the identity of the log files from execution of the discovery script, the discovery script independent of the operating system and file system of the SAN node, the log collection utility further operable to:
enumerate the log files in a list, the list including definitions indicative of the location of each of the log files, wherein the log file list is a task definition file indicative of a location of at least one log file on each of a set of hosts; and generate the collection script from the identified set of available log files and the received identity of the log files, the collection script having commands for accessing each of the log files identified in the set of log files.

13. A computer program product having a computer readable storage medium operable to store computer program logic embodied in computer program code encoded thereon as an encoded set of processor based instructions for performing a method of retrieving log files in a heterogeneous storage area network (SAN), comprising:

computer program code for computing an identity of a set of log files in a network environment including a plurality of nodes, the network environment including a storage area network (SAN) having SAN nodes;

computer program code for generating, from the identity of the the log files, a collection script operable to retrieve each of the identified log files, the collection script generated independently of an operating system of a SAN node;

computer program code for sending the collection script to the SAN node;

computer program code for receiving, from the SAN node, each of the log files collected by the collection script;

computer program code for determining, based on system load, whether to compress collected log files at a host or at a server;

computer program code for selectively compressing the collected log files at the host or at the server based on the determining;

computer program code for aggregating, on each host, the collected log files obtained from the collection script;

computer program code for transmitting, by each host, the collected log files to the server;

computer program code for identifying categories of log files, categories including at least one of infrastructure, agent or 3rd party applications; and computer program code for aggregating transmitted log files from each host at the server in a common repository, the log files arranged by categories.

14. The method of claim 4, wherein each of the SAN nodes, within the plurality of SAN nodes, contains one or more log files, and wherein at least two of the SAN nodes have different operating systems that store log files in different locations within the at least two of the SAN nodes, wherein the log files are initially unknown to an entity that that retrieves the log files.

15. The method of claim 4, further comprising:

generating the collection script from the identified set of available log files, from the discovery script, and from the received identity of the log files;

receiving the collection script at each of a plurality of SAN nodes;

executing the script in each of the SAN nodes;

identifying, from the executed script, a set of log files;

zipping the identified log files into an aggregated log file;

transmitting the aggregated log file back to the initiating host;

wherein the discovery script is executable on the SAN node, the SAN node operable to generate the identity of the log files from execution of the discovery script, the discovery script independent of the operating system and file system of the SAN node; and wherein generating the discovery script includes using a log file designator that describes a manner of locating log files by referencing multiple log files via wildcards and directory specifications, wherein generating the discovery script occurs before generating the collection script.

16. The computer program product of claim 13, further comprising:

computer program code for identifying a set of log files accessible via a SAN;

computer program code for generating a discovery script having commands for discovering each of the log files identified in the set of log files;

computer program code for sending the discovery script to a SAN node having at least one of the identified log files, the SAN node operable to execute the discovery script; and computer program code for receiving, from the SAN node, an identity of each of identified via the executed discovery script.

* * * * *